(12) United States Patent
Ishiwaka et al.

(10) Patent No.: US 11,922,552 B2
(45) Date of Patent: Mar. 5, 2024

(54) DATA PROCESSING DEVICE, PROGRAM, AND DATA PROCESSING METHOD FOR GENERATING ANIMATION DATA REPRESENTING MOVEMENT OF CLOTHING WORN BY WEARER'S BODY

(71) Applicant: SoftBank Corp., Tokyo (JP)

(72) Inventors: Yuko Ishiwaka, Hokkaido (JP); Kazuto Suda, Tokyo (JP); Sho Kakazu, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/182,400

(22) Filed: Mar. 13, 2023

(65) Prior Publication Data

US 2023/0222724 A1  Jul. 13, 2023

Related U.S. Application Data

(63) Continuation of application No. PCT/JP2021/005760, filed on Feb. 16, 2021.

(30) Foreign Application Priority Data

Nov. 4, 2020 (JP) .................. 2020-184621

(51) Int. Cl.
*G06T 13/40* (2011.01)

(52) U.S. Cl.
CPC .......... *G06T 13/40* (2013.01); *G06T 2210/16* (2013.01)

(58) Field of Classification Search
None
See application file for complete search history.

(56) References Cited

U.S. PATENT DOCUMENTS

| | | | | |
|---|---|---|---|---|
| 7,843,456 B2 * | 11/2010 | Xu | .......................... | G06T 13/40 |
| | | | | 345/473 |
| 10,482,646 B1 * | 11/2019 | Dalstein | ................... | G06T 17/20 |
| 11,158,121 B1 * | 10/2021 | Tung | ...................... | G06N 3/045 |
| 11,308,687 B1 * | 4/2022 | Liang | .................... | G06F 3/0488 |

(Continued)

FOREIGN PATENT DOCUMENTS

| | | |
|---|---|---|
| JP | H09223247 A | 8/1997 |
| JP | 2000242683 A | 9/2000 |
| JP | 2006249618 A | 9/2006 |

OTHER PUBLICATIONS

Teran et al., "Finite Volume Methods for the Simulation of Skeletal Muscle" (Year: 2003).*

(Continued)

*Primary Examiner* — Hilina K Demeter

(57) ABSTRACT

There is provided a data processing device including: a data acquisition unit configured to acquire animation data in which clothing moves according to a motion of a wearer's body wearing the clothing; and a data update unit configured to update the animation data based on three types of elements having ratios in accordance with a specified type of an emotion. There is provided a data processing method that is executed by a computer, the data processing method including: acquiring animation data in which clothing moves according to a motion of a wearer's body wearing the clothing; and updating the animation data based on three types of elements having ratios in accordance with a specified characteristic of a motion.

8 Claims, 7 Drawing Sheets

(56) References Cited

U.S. PATENT DOCUMENTS

2006/0202986 A1    9/2006  Okada
2018/0240281 A1*  8/2018  Vincelette ............... G06T 15/20
2019/0026954 A1*  1/2019  Vats ........................ G06T 13/40

OTHER PUBLICATIONS

Carignan et al., "Dressing Animated Synthetic Actors with Complex Deformable Clothes" (Year: 1992).*
Etzmub et al., "A Fast Finite Element Solution for Cloth Modelling" (Year: 2003).*
Vassilev et al., "Efficient Cloth Model for Dressing Animated Virtual People" (Year: 2000).*
Umetani N. et al, Sensitive couture for interactive garment modeling and editing, ACM Transactions on Graphics (SIGGRAPH 2011) 30, 4 (2011).
Berthouzoz F. et al, Parsing sewing patterns into 3d garments, ACM Trans. Graph. 32, 4 (Jul. 2013), 85:1-85:12.
International Search Report and (ISA/237) Written Opinion of the International Search Authority for International Patent Application No. PCT/JP2021/005760, mailed by the Japan Patent Office dated Apr. 13, 2021.
What is a new generation of cross simulators?, Nikkei computer graphics, 1998, No. 146, pp. 124-127.

* cited by examiner

410

412

414

510

512

514

DATA PROCESSING DEVICE, PROGRAM, AND DATA PROCESSING METHOD FOR GENERATING ANIMATION DATA REPRESENTING MOVEMENT OF CLOTHING WORN BY WEARER'S BODY

The contents of the following Japanese patent application(s) are incorporated herein by reference:
NO. 2020-184621 filed in JP on Nov. 4, 2020
NO. PCT/JP2021/005760 filed in WO on Feb. 16, 2021

BACKGROUND

1. Technical Field

The present invention relates to a data processing device, a program, and a data processing method.

2. Related Art

Patent Document 1 discloses a technique for estimating in real time a posture of a person who tries on clothing, and simulating motions of the clothing in agreement with estimated time series postures. Non-Patent Document 1 and Non-Patent Document 2 disclose tools and the like for generating a garment model.

PRIOR ART DOCUMENT

Patent Document

Patent Document 1: Japanese Patent Application Publication No. 2006-249618

Non-Patent Document

Non-Patent Document 1: UMETANI N., KAUFMAN D. M., IGARASHI T., GRINSPUN E.: Sensitive couture for interactive garment editing and modeling. ACM Transactions on Graphics (SIGGRAPH 2011) 30, 4 (2011).
Non-Patent Document 2: BERTHOUZOZ F., GARG A., KAUFMAN D. M., GRINSPUN E., AGRAWALA M.: Parsing sewing patterns into 3d garments. ACM Trans. Graph. 32, 4 (July 2013), 85:1-85:12.

DESCRIPTION OF EXEMPLARY EMBODIMENTS

Hereinafter, the present invention will be described through embodiments of the invention, but the embodiments hereinafter do not limit the invention according to the scope of the claims. In addition, not all combinations of the features described in the embodiments necessarily have to be necessary to solving means of the invention.

Figure 1:
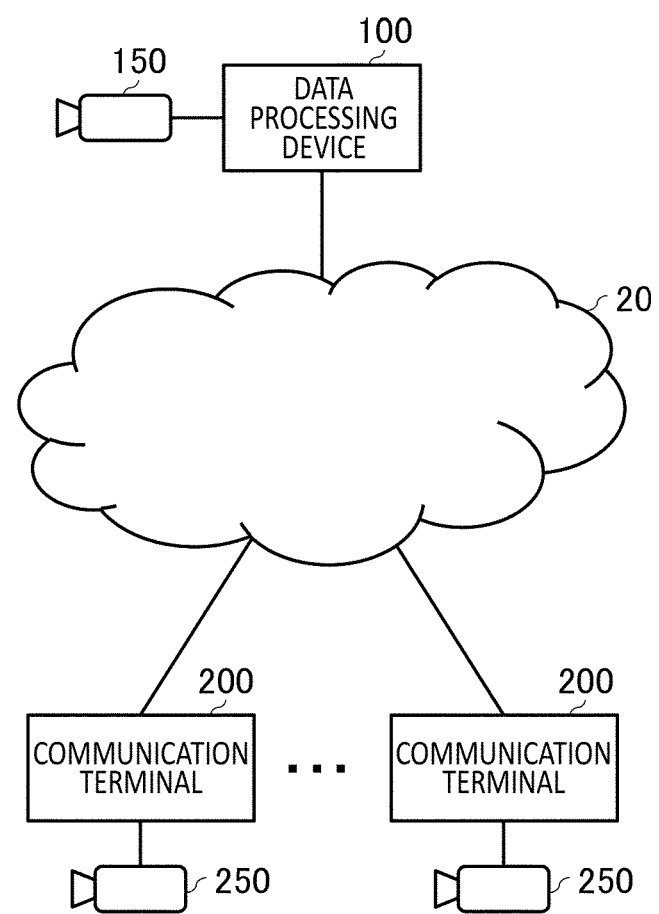
FIG. 1 schematically shows an example of a data processing device 100.

FIG. 1 schematically shows an example of a data processing device 100. The data processing device 100 generates animation data in which clothing moves according to a motion of a wearer's body wearing the clothing. An example of the wearer's body includes bodies of a human, an animal, and the like, but may be a body of any subject that wears the clothing and moves. The data processing device 100 according to the present embodiment particularly generates the animation data in which the clothing moves in accordance with a specified characteristic of the motion.

In a real world, the clothing moves according to laws of physics, and a motion of a wearer and an environment, but in the animation data, it is thought that various things can be expressed by giving a characteristic of a motion for the clothing. For example, by adding coolness to the motion of the clothing in an animation in which the wearer is walking, it may be possible to give an overall cool impression.

In the related art, for example, there has been known a model for expressing what is desired to be expressed with a plurality of parameters, such as a model of Lovheim cube of emotion for expressing emotions with three types of parameters. However, the model in the related art cannot be directly applied to the characteristic of the motion of the clothing.

The inventors have repeatedly examined three types of elements for realizing the expression of the characteristic of the motion of the clothing, and derived a plurality of types of combinations. A representative combination thereof includes a temporal element of the motion of the clothing, an elasticity element of the clothing, and a curve element of the clothing. The data processing device 100 generates, for example, animation data (which may be referred to as reference data) in which the clothing moves according to the laws of physics and the motion of the wearer's body, and generates, by updating the animation data based on the three types of elements having ratios in accordance with the specified characteristic of the motion, animation data (which may be referred to as update data) in which the characteristic of the motion of the clothing is reflected.

More specifically, the data processing device 100 generates the reference data including wearer's body data and clothing data. The wearer's body data may be animation data in which the wearer's body moves. The clothing data may be animation data of the clothing that moves according to the laws of physics and the motion of the wearer's body. The data processing device 100 generates the update data by generating the clothing data in which the motion of the clothing is changed based on the three types of elements having the ratios in accordance with the specified characteristic of the motion.

An example of the temporal element is a delay. The data processing device 100 delays a frame of the clothing data in the reference data as the ratio of the delay element is high. This makes it possible to slow down the motion of the clothing relative to the wearer's body in the update data, with respect to the motion of the clothing relative to the wearer's body in the reference data, and makes it possible to enhance a lingering impression which is given to a viewer of the update data. Another example of the temporal element includes an element that speeds up a time as opposed to the delay, a rhythm element, or the like.

The curve element represents a degree of a curve feature of the clothing. The data processing device 100 enhances the curve feature of the clothing as the ratio of the curve element is high. Thereby, for example, when the clothing is slightly swaying according to the motion of the wearer's body in the reference data, it is possible to increase a degree of the swaying of the clothing in the update data, and it is possible to enhance a soft impression which is given to the viewer of the update data.

The elasticity element represents a degree of stretchability of the clothing. The data processing device 100 increases the degree of the stretchability of the clothing as the ratio of the elasticity element is high. Thereby, for example, when the clothing is fluttering according to the motion of the wearer's body in the reference data, it is possible to increase a degree of the fluttering of the clothing in the update data, and it is possible to enhance a dynamic impression which is given to the viewer of the update data.

The data processing device 100 may generate the reference data according to a motion of a real-life person or the like. The data processing device 100 generates, for example, the wearer's body data which represents, by a polygon mesh, a three-dimensional shape of a person captured by the camera 150, and the clothing data which represents, by the polygon mesh, a three-dimensional shape of clothing worn by the person. In addition, the data processing device 100 may generate the reference data such as a CG character regardless of the motion of the real-life person.

The data processing device 100 displays, for example, the generated update data on a display that is included in the data processing device 100. In addition, the data processing device 100 may cause a communication terminal 200 to display the generated update data, for example, by transmitting the generated update data to the communication terminal 200 via a network 20.

The communication terminal 200 may be a PC (Personal Computer), a tablet terminal, a smart phone, and the like. The data processing device 100 and the communication terminal 200 may communicate via the network 20. The network 20 may include the Internet. The network 20 may include a LAN (Local Area Network). The network 20 may include a mobile communication network. The mobile communication network may conform to any of the 3G (3rd Generation) communication system, the LTE (Long Term Evolution) communication system, the 5G (5th Generation) communication system, and the communication system for 6G (6th Generation) or the subsequent generation.

The data processing device 100 may receive the reference data from the communication terminal 200. The communication terminal 200 generates, for example, the reference data which includes the wearer's body data of a person captured by a camera 250, and the clothing data of the clothing worn by the person, and transmits the reference data to the data processing device 100. The camera 250 may be built in the communication terminal 200, or may also be externally attached to the communication terminal 200.

Figure 2:
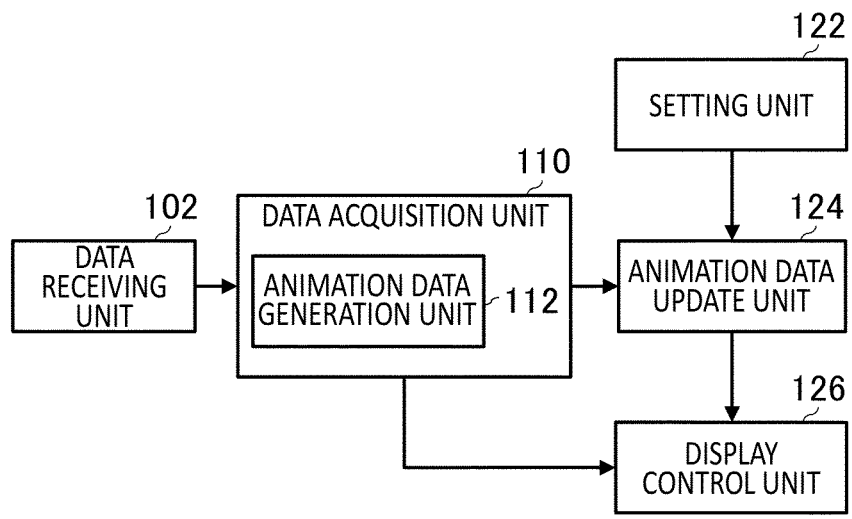
FIG. 2 schematically shows an example of a functional configuration of the data processing device 100.

FIG. 2 schematically shows an example of a functional configuration of the data processing device 100. The data processing device 100 includes a data receiving unit 102, a data acquisition unit 110, a setting unit 122, an animation data update unit 124, and a display control unit 126.

The data receiving unit 102 receives various types of data. The data receiving unit 102 may receive the various types of data via the network 20. The data receiving unit 102 receives, for example, the various types of data from the communication terminal 200.

The data receiving unit 102 receives, for example, image capture data obtained by capturing a person or the like. The data receiving unit 102 may receive the reference data. The data receiving unit 102 may receive the wearer's body data.

The data acquisition unit 110 is configured to acquire the animation data in which the clothing moves according to the motion of the wearer's body wearing the clothing. The data acquisition unit 110 may acquire the reference data. The data acquisition unit 110 acquires, for example, reference data received by the data receiving unit 102. The data acquisition unit 110 may acquire the reference data generated, by a user of the data processing device 100, by using the data processing device 100. The data acquisition unit 110 may acquire reference data from a portable computer-readable storage medium.

The data acquisition unit 110 may acquire the reference data by generating the reference data. The data acquisition unit 110 has an animation data generation unit 112.

The animation data generation unit 112 generates animation data in which the clothing moves according to the laws of physics and the motion of the wearer's body wearing the clothing, for example, by analyzing the image capture data received by the data receiving unit 102. In addition, the animation data generation unit 112 may generate the data the reference data by generating the clothing data of the clothing that is worn on the wearer's body included in the wearer's body data and that moves according to the laws of physics and the motion of the wearer's body, by analyzing the wearer's body data received by the data receiving unit 102. The animation data generation unit 112 may generate the reference data by using any known technique.

The setting unit 122 performs various types of settings. For example, the setting unit 122 sets the characteristic of the motion. The setting unit 122 sets, for example, the characteristic of the motion specified by the user of the data processing device 100, a user of the communication terminal 200, or the like, from among a plurality of characteristics of motions registered in advance. An example of the characteristic of the motion includes the coolness, cuteness, comicalness, or the like, but is not limited to these, and various types of characteristics of the motions may be able to be set.

The animation data update unit 124 updates the reference data acquired by the data acquisition unit 110 based on the characteristic of the motion set by the setting unit 122. The animation data update unit 124 may update the reference data based on the three types of elements having the ratios in accordance with the characteristic of the motion.

The animation data update unit 124 may store, in advance, association data obtained by associating the characteristic of the motion with the ratios of the three types of elements, to specify the ratios of the three types of elements in accordance with the specified characteristic of the motion, by referring to the association data.

The display control unit 126 performs a control to display the animation data (that is, the update data) updated by the animation data update unit 124. The display control unit 126 causes, for example, the update data to be displayed on a display included in the data processing device 100. The display control unit 126 may perform a control to display the display data on the display included in communication terminal 200, by transmitting the update data to the communication terminal 200.

Figure 3:
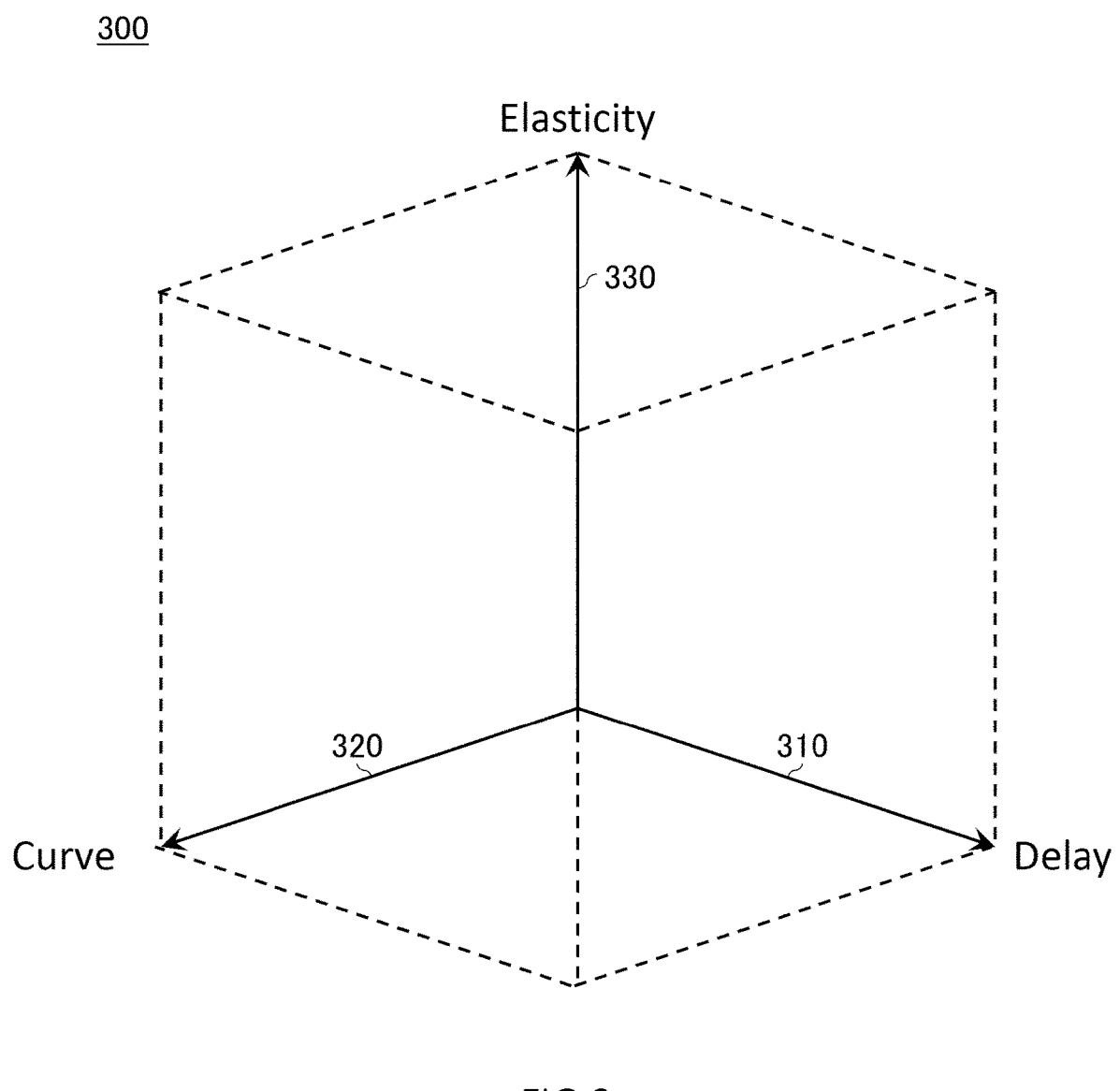
FIG. 3 is an illustration for describing a parameter 300.

FIG. 3 is an illustration for describing a parameter 300. The parameter 300 may be represented by a space constituted by the three types of elements. Here, the parameter 300 constituted by a delay 310, a curve 320, and elasticity 330 is illustrated.

The animation data update unit 124 may store a spatial position of the parameter 300 in association with each of the plurality of characteristics of the motions. The animation data update unit 124 associates, for example, the coolness with a position where the ratio of the delay 310 is increased. In addition, the animation data update unit 124 associates, for example, the cuteness with a position where the ratio of the curve 320 is increased. The animation data update unit 124 associates, for example, the comicalness with a position where the ratios of the delay 310 and the elasticity 330 are increased.

Figure 4:
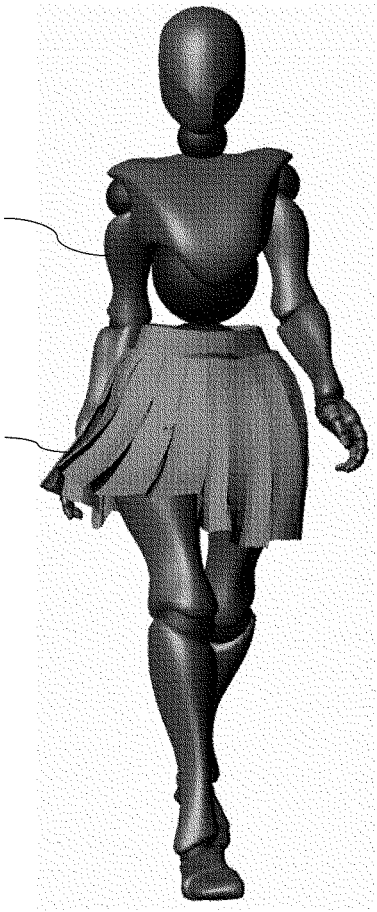
FIG. 4 schematically shows an example of update data 500 when coolness is expressed.
Figure 4:
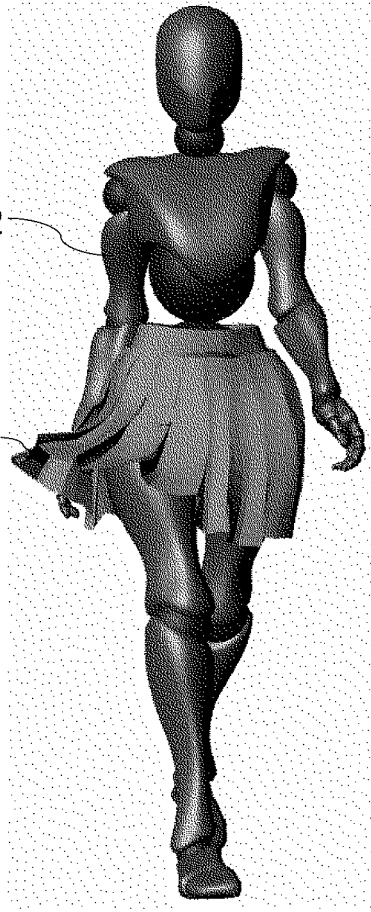

FIG. 4 schematically shows an example of update data 500 when coolness is expressed. The animation data update unit 124 may update, when the coolness is expressed, the animation data by increasing the ratio of the temporal element among the three types of elements. The animation data update unit 124 may update, when the coolness is expressed, the animation data such that a degree of the delay of the clothing is increased.

Wearer's body data 402 in reference data 400, and wearer's body data 502 in the update data 500 move in the same manner. In clothing data 504 in the update data 500, the delay with respect to the wearer's body data 502 is greater in comparison with a case in clothing data 404 in the reference data 400. That is, in the update data 500, it is possible to make an impressive expression such that the clothing moves, with respect to the motion of the wearer's body, more slowly than usual, and it is possible to express the coolness.

Figure 5:
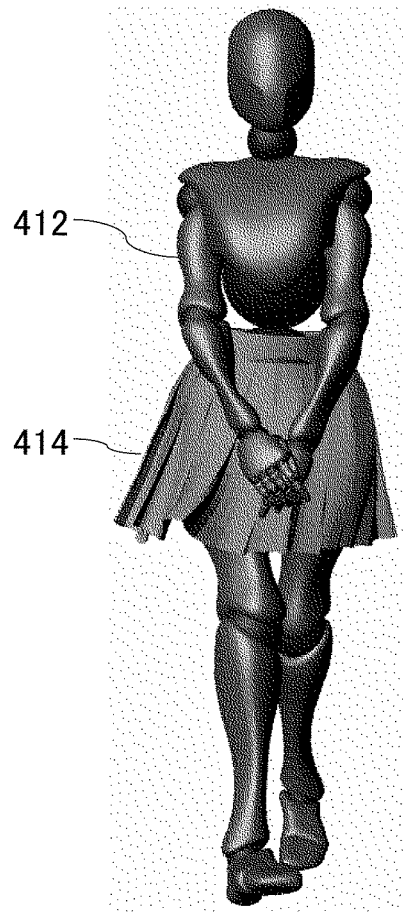
FIG. 5 schematically shows an example of update data 510 when cuteness is expressed.
Figure 5:
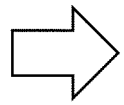
Figure 5:
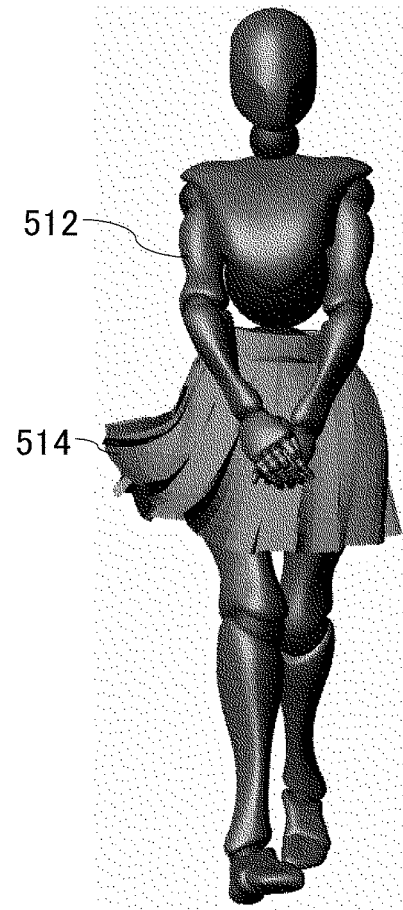

FIG. 5 schematically shows an example of update data 510 when cuteness is expressed. The animation data update unit 124 may update, when the cuteness is expressed, the animation data by increasing the ratio of the curve element among the three types of elements.

Wearer's body data 412 in reference data 410, and wearer's body data 512 in the update data 510 move in the same manner. In clothing data 514 in the update data 510, a degree of a curve feature is greater in comparison with a case in clothing data 414 in the reference data 410. That is, in the update data 510, it is possible to make a cute expression by the clothing being more rounded than usual and moving softly in an arc.

Figure 6:
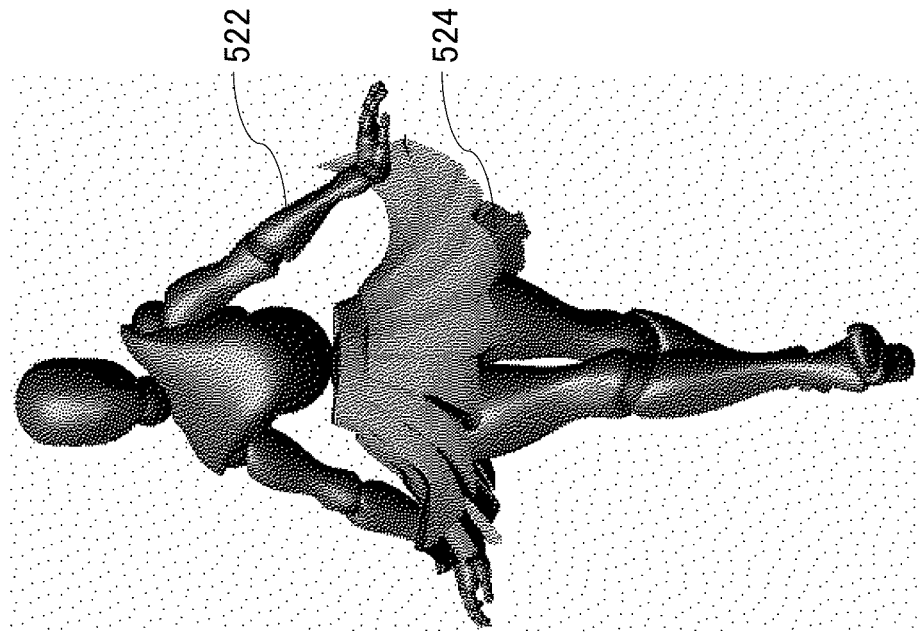
FIG. 6 schematically shows an example of update data 520 when comicalness is expressed.
Figure 6:
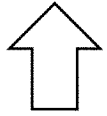
Figure 6:
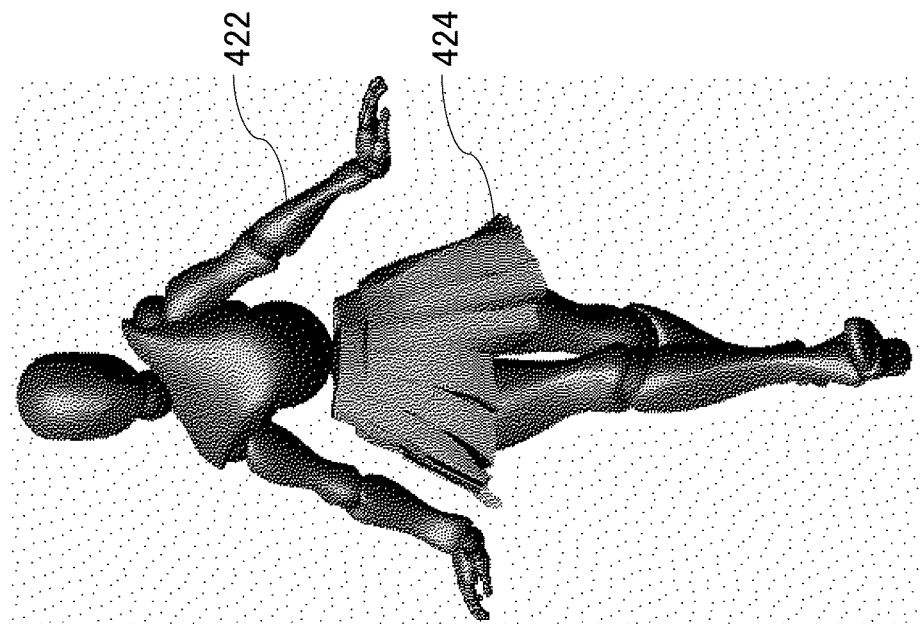

FIG. 6 schematically shows an example of update data 520 when comicalness is expressed. The animation data update unit 124 may update, when the comicalness is expressed, the animation data by increasing the ratios of the temporal element and the elasticity element among the three types of elements. The animation data update unit 124 increases, for example, the ratios of the delay element and the elasticity element among the three types of elements.

Wearer's body data 422 in reference data 420, and wearer's body data 522 in the update data 520 move in the same manner. In clothing data 524 in the update data 520, the stretchability is greater and the delay with respect to the wearer's body data 522 is greater in comparison with a case in clothing data 424 in the reference data 420. That is, in the update data 510, it is possible to express the comicalness by the clothing moving, with respect to the motion of the wearer's body, to be more slow than usual, and to be stretched long.

In the above embodiment, the case where the animation data update unit 124 updates the reference data based on the temporal element, the curve element, and the elasticity element has been described; however, the present invention is not limited to this. The animation data update unit 124 may update the reference data further based on at least any of an environmental element of a space where the wearer's body is located, a material element of the clothing, or an effect element for the clothing.

An example of the environmental element of the space where the wearer's body is located includes a lighting element. The animation data update unit 124 may change an expression of the lighting according to the characteristic of the motion which is to be expressed. The expression of the lighting may be changed, for example, by changing a degree of the lighting, an angle of the lighting, a color of the lighting, and the like. It should be noted that the degree, the angle, and the color are examples, and the expression of the lighting may be changed by changing another element. For example, the animation data update unit 124 weakens the degree of the lighting for a brighter characteristic, and increases the degree of the lighting for a darker characteristic. Thereby, when the darker characteristic is expressed, it may be possible to add an expression of darkness by increasing the degree of the lighting to increase a shadow element.

An example of the material element of the clothing includes a material quality element of the clothing. The animation data update unit 124 may change a material quality of the clothing according to the characteristic of the motion which is to be expressed. For example, the animation data update unit 124 changes the material quality of the clothing to a material quality which is lighter when a brighter characteristic is expressed, and changes the material quality of the clothing to a material quality which is heavier when a darker characteristic is expressed. This makes it is possible to set an animation in which the clothing moves lightly for a bright characteristic, and the clothing moves heavily for a dark characteristic. In addition, for example, the animation data update unit 124 changes the material of the clothing to a material which has higher reflectivity when the brighter characteristic is expressed, and changes the material of the clothing to a material which has lower reflectivity when the darker characteristic is expressed. Thereby, when the brighter characteristic is expressed, it may be possible to add an expression of brightness of the characteristic by changing the material to the material which has higher reflectivity to enhance the brightness of the clothing.

An example of the effect element for the clothing is a degree that an object overlaps the clothing. The animation data update unit 124 may change a degree that the object overlaps the clothing according to the characteristic of the motion which is to be expressed. For example, the animation data update unit 124 increases a degree of an object having a dark image, such as raindrops, when a darker characteristic is expressed. Thereby, when the darker characteristic is expressed, it may be possible to add an expression of a dark characteristic by adding, for the clothing, the object having the dark image by an increased degree.

The animation data update unit 124 may update the reference data based on three elements among the temporal element of the motion of the clothing, the elasticity element of the clothing, the curve element of the clothing, the environmental element of the space where the wearer's body is located, the material element of the clothing, and the effect element for the clothing. For example, the animation data update unit 124 updates the reference data based on at least two elements among the temporal element of the motion of the clothing, the elasticity element of the clothing, or the curve element of the clothing, and based on three elements selected from the environmental element of the space where the wearer's body is located, the material element of the clothing, and the effect element for the clothing.

Figure 7:
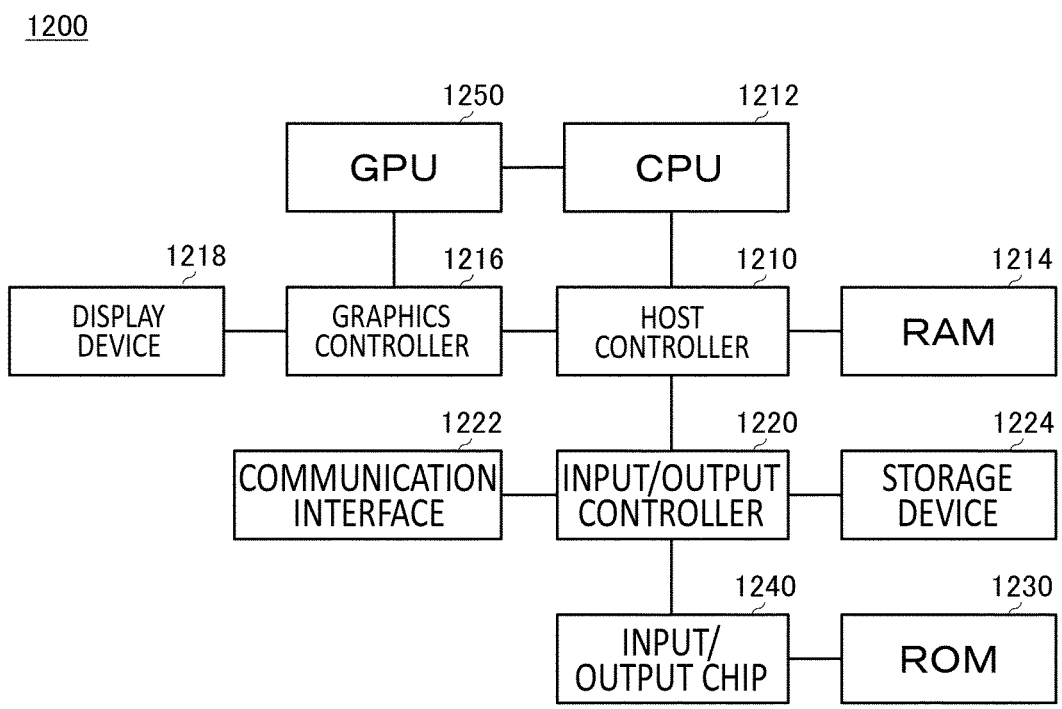
FIG. 7 schematically shows an example of a hardware configuration of a computer 1200 that functions as the data processing device 100.

FIG. 7 schematically shows an example of a hardware configuration of a computer 1200 that functions as the data processing device 100. A program installed in the computer 1200 can cause the computer 1200 to function as one or more "units" of an apparatus according to the present embodiment, or cause the computer 1200 to perform operations associated with the apparatus according to the present embodiment or perform one or more "units" thereof, and/or cause the computer 1200 to perform the process according to the present embodiment or perform the steps of the process. Such a program may be executed by a CPU 1212 to cause the computer 1200 to execute specific operations associated with some or all of blocks in flowcharts and block diagrams described in the present specification.

The computer 1200 according to the present embodiment includes the CPU 1212, a RAM 1214, and a graphics controller 1216, which are connected to each other via a host controller 1210. The computer 1200 also includes a GPU 1250. The computer 1200 also includes input/output units such as a communication interface 1222, a storage device 1224, a DVD drive, and an IC card drive, which are connected to the host controller 1210 via an input/output controller 1220. The DVD drive may be a DVD-ROM drive, a DVD-RAM drive, etc. The storage device 1224 may be a hard disk drive, a solid-state drive, and the like. The computer 1200 also includes a legacy input/output unit such as a ROM 1230 and a keyboard, which are connected to the input/output controller 1220 via an input/output chip 1240.

The CPU 1212 operates according to the programs stored in the ROM 1230 and the RAM 1214, thereby controlling each unit. The graphics controller 1216 acquires image data which is generated by the CPU 1212, in a frame buffer or the like provided in the RAM 1214 or in itself, so as to cause the image data to be displayed on a display device 1218.

The communication interface 1222 communicates with other electronic devices via a network. The storage device 1224 stores a program and data used by the CPU 1212 in the computer 1200. The DVD drive reads the programs or the data from the DVD-ROM or the like, and provides the storage device 1224 with the programs or the data. The IC card drive reads the programs and the data from an IC card and/or writes the programs and the data into the IC card.

The ROM 1230 stores therein a boot program or the like executed by the computer 1200 at the time of activation, and/or a program depending on the hardware of the computer 1200. The input/output chip 1240 may also connect various input/output units to the input/output controller 1220 via a USB port, a parallel port, a serial port, a keyboard port, a mouse port, or the like.

A program is provided by a computer-readable storage medium such as the DVD-ROM or the IC card. The program is read from the computer-readable storage medium, installed into the storage device 1224, RAM 1214, or ROM 1230, which are also examples of the computer-readable storage medium, and executed by the CPU 1212. The information processing written in the programs is read into the computer 1200, resulting in cooperation between the programs and the above various types of hardware resources. A device or a method may be constituted by implementing the operation or processing of information in accordance with the use of the computer 1200.

For example, in a case where communication is performed between the computer 1200 and an external device, the CPU 1212 may execute a communication program loaded in the RAM 1214 and instruct the communication interface 1222 to perform communication processing based on processing written in the communication program. The communication interface 1222, under a control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. Then, the CPU 1212 may write back the processed data to the external recording medium.

Various types of information such as various types of programs, data, tables, and databases may be stored in a recording medium and subjected to information processing. The CPU 1212 may perform various types of processing on the data read from the RAM 1214 to write the result back to the RAM 1214, the processing including various types of operations, information processing, condition judging, conditional branch, unconditional branch, retrieval/replacement of information, etc., as described throughout the present disclosure and specified by an instruction sequence of programs. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying the predetermined condition.

The above described programs or software modules may be stored in the computer-readable storage medium on the computer 1200 or near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flowcharts and block diagrams in the present embodiment may represent steps of processes in which operations are performed or "units" of apparatuses responsible for performing operations. Certain steps and "units" may be implemented by dedicated circuitry, programmable circuitry supplied with computer-readable instructions stored on a computer-readable storage medium, and/or processors supplied with computer-readable instructions stored on a computer-readable storage medium. Dedicated circuitry may include digital and/or analog hardware circuits, and may include integrated circuits (IC) and/or discrete circuits. For example, programmable circuitry may include reconfigurable hardware circuits including logical AND, OR, XOR, NAND, NOR, and other logical operations, flip-flops, registers, and memory elements, such as field-programmable gate arrays (FPGA), programmable logic arrays (PLA), and the like.

A computer-readable storage medium may include any tangible device that can store instructions for execution by a suitable device, and as a result, the computer-readable storage medium having instructions stored therein includes an article of manufacture including instructions which can be executed to create means for executing operations specified in the flowcharts or block diagrams. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disc (DVD), a Blu-ray (registered trademark) disc, a memory stick, an integrated circuit card, or the like.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

Computer-readable instructions may be provided to a processor of a general-purpose computer, a special-purpose computer, or another programmable data processing device, or to programmable circuitry, locally or via a local area network (LAN) or a wide area network (WAN) such as the Internet, so that the processor of the general-purpose computer, the special-purpose computer, or the other programmable data processing device, or the programmable circuitry executes the computer-readable instructions to create means for executing operations specified in the flowcharts or block diagrams. Examples of the processor include a computer processor, a processing unit, a microprocessor, a digital signal processor, a controller, a microcontroller, and the like.

While the present invention has been described above by using the embodiments, the technical scope of the present invention is not limited to the scope according to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20: network; 100: data processing device; 102: data receiving unit; 110: data acquisition unit; 112: animation data generation unit; 122: setting unit; 124: animation data update unit; 126: display control unit; 150: camera; 200: communication terminal; 250: camera; 300: parameter; 310: delay; 320: curve; 330: elasticity; 400: reference data; 402: wearer's body data; 404: clothing data; 410: reference data; 412: wearer's body data; 414: clothing data; 420: reference data; 422: wearer's body data; 424: clothing data; 500: update data; 502: wearer's body data; 504: clothing data; 510: update data; 512: wearer's body data; 514: clothing data; 520: update data; 522: wearer's body data; 524: clothing data; 1200: computer; 1210: host controller; 1212: CPU; 1214: RAM; 1216: graphics controller; 1218: display device; 1220: input/output controller; 1222: communication interface; 1224: storage device; 1230: ROM; 1240: input/output chip; 1250: GPU.

What is claimed is:

1. A data processing device comprising:
at least one processor;
a data acquisition unit configured to acquire, using the at least one processor, animation data in which clothing moves according to a motion of a wearer's body wearing the clothing; and
a data update unit configured to update, using the at least one processor, the animation data based on three types of elements having ratios in accordance with a specified characteristic of a motion, wherein
the characteristic of the motion includes at least any of coolness, cuteness, or comicalness,
the three types of elements include a temporal element of the motion of the clothing, an elasticity element of the clothing, and a curve element of the clothing, and
the data update unit is configured to update, using the at least one processor, the animation data by (i) increasing the ratio of the temporal element among the three types of elements when the coolness is specified as the characteristic of the motion and the coolness is expressed, (ii) increasing the ratio of the curve element among the three types of elements when the cuteness is specified as the characteristic of the motion and the cuteness is expressed, or (iii) increasing the ratios of the temporal element and the elasticity element when the comicalness is specified as the characteristic of the motion and the comicalness is expressed.

2. The data processing device according to claim 1, wherein
the data acquisition unit is configured to generate, using the at least one processor, the animation data according to laws of physics.

3. The data processing device according to claim 1, wherein
the temporal element represents a degree of a delay, and
the data update unit is configured to update, using the at least one processor, when the coolness is specified as the characteristic of the motion and the coolness is expressed, the animation data such that the degree of the delay of the clothing is increased.

4. The data processing device according to claim 1, wherein
the data update unit is configured to update, using the at least one processor, the animation data further based on at least any of an environmental element of a space where the wearer's body is located, a material element of the clothing, or an effect element for the clothing.

5. The data processing device according to claim 1, wherein
the three types of elements are three among a temporal element of the motion of the clothing, an elasticity element of the clothing, a curve element of the clothing, an environmental element of a space where the wearer's body is located, a material element of the clothing, and an effect element for the clothing.

6. The data processing device according to claim 5, wherein
the three types of elements include at least two among the temporal element of the motion of the clothing, the elasticity element of the clothing, or the curve element of the clothing.

7. A non-transitory computer-readable storage medium having stored thereon a program for causing a computer to perform steps of:
acquiring animation data in which clothing moves according to a motion of a wearer's body wearing the clothing; and
updating the animation data based on three types of elements having ratios in accordance with a specified characteristic of a motion, wherein
the characteristic of the motion includes at least any of coolness, cuteness, or comicalness, wherein
the three types of elements include a temporal element of the motion of the clothing, an elasticity element of the clothing, and a curve element of the clothing, and
updating the animation data is performed by (i) increasing the ratio of the temporal element among the three types of elements when the coolness is specified as the characteristic of the motion and the coolness is expressed, (ii) increasing the ratio of the curve element among the three types of elements when the cuteness is specified as the characteristic of the motion and the cuteness is expressed, or (iii) increasing the ratios of the temporal element and the elasticity element when the comicalness is specified as the characteristic of the motion and the comicalness is expressed.

8. A data processing method that is executed by a computer, the data processing method comprising:
acquiring animation data in which clothing moves according to a motion of a wearer's body wearing the clothing; and
updating the animation data based on three types of elements having ratios in accordance with a specified characteristic of a motion, wherein
the characteristic of the motion includes at least any of coolness, cuteness, or comicalness, wherein
the three types of elements include a temporal element of the motion of the clothing, an elasticity element of the clothing, and a curve element of the clothing, and
updating the animation data is performed by (i) increasing the ratio of the temporal element among the three types of elements when the coolness is specified as the characteristic of the motion and the coolness is expressed, (ii) increasing the ratio of the curve element among the three types of elements when the cuteness is specified as the characteristic of the motion and the cuteness is expressed, or (iii) increasing the ratios of the temporal element and the elasticity element when the comicalness is specified as the characteristic of the motion and the comicalness is expressed.

\* \* \* \* \*